(12) United States Patent
Peter

(10) Patent No.: US 10,842,070 B2
(45) Date of Patent: Nov. 24, 2020

(54) ANGLE ADJUSTMENT DEVICE FOR DISC-TYPE COULTERS

(71) Applicant: Flo-Rite Inc., Hicksville, OH (US)

(72) Inventor: Jeffrey J. Peter, Hicksville, OH (US)

(73) Assignee: Flo-Rite, Inc., Hicksville, OH (US)

(*) Notice: Subject to any disclaimer, the term of this patent is extended or adjusted under 35 U.S.C. 154(b) by 137 days.

(21) Appl. No.: 16/154,946

(22) Filed: Oct. 9, 2018

(65) Prior Publication Data

US 2020/0107491 A1    Apr. 9, 2020

(51) Int. Cl.
*A01C 5/06*    (2006.01)
*A01C 7/06*    (2006.01)
*A01C 7/20*    (2006.01)

(52) U.S. Cl.
CPC ............... *A01C 5/064* (2013.01); *A01C 7/06* (2013.01); *A01C 7/201* (2013.01)

(58) Field of Classification Search
CPC ........... A01C 5/064; A01C 5/062; A01C 5/06; A01C 5/00; A01C 7/06; A01C 7/00; A01C 7/201; A01C 7/20
See application file for complete search history.

(56) References Cited

U.S. PATENT DOCUMENTS

| | | | | |
|---|---|---|---|---|
| 1,024,208 | A * | 4/1912 | Langley | A01B 21/086 172/574 |
| 6,082,275 | A * | 7/2000 | Schaffert | A01C 5/068 111/150 |
| 9,565,797 | B2 * | 2/2017 | Peter | A01C 7/08 |
| 9,908,222 | B2 * | 3/2018 | Peter | B25B 27/02 |
| 10,149,426 | B2 * | 12/2018 | Peter | A01C 7/08 |
| 10,201,123 | B2 * | 2/2019 | Peter | F16M 13/02 |

* cited by examiner

*Primary Examiner* — Christopher J. Novosad
(74) *Attorney, Agent, or Firm* — Kevin R. Erdman; Brannon Sowers & Cracraft PC

(57) ABSTRACT

An adjustment mechanism for seed or grain drill planters which allows for the adjustment of the camber and/or toe of individual coulters on the planter.

6 Claims, 7 Drawing Sheets

ANGLE ADJUSTMENT DEVICE FOR DISC-TYPE COULTERS

CROSS-REFERENCE TO RELATED APPLICATIONS

The present application is a U.S. Utility application, claiming priority from U.S. patent application Ser. No. 15/405,923, filed Jan. 13, 2017, that claims priority to the PCT International Application Serial No. PCT/US2016/066214, filed Dec. 12, 2016, which claims priority under 35 USC 119(e) of U.S. Provisional Applications 62/312,221; 62/278,081; and 62/270,957; filed on Mar. 23, 2016; Jan. 13, 2016; and Dec. 22, 2015; respectively, the discloses of each of these applications are hereby incorporated by reference herein.

BACKGROUND

Field of the Invention

The invention relates to agricultural planting implements. More specifically, the field of the invention is that of coulter discs for planters.

Description of the Related Art

Grain drills or seed drills are automatic sowing machines which position seeds in the soil before covering them. Traditionally grain drills comprise a hopper for holding seeds, a means for metering seeds from the hopper, a series of tubes for distributing seeds from the metering means to the planting mechanism, and one or more planting mechanisms for digging a furrow, depositing the seeds, and covering the furrow. Seeds may be delivered via gravity or using air pressure to move seeds through the tubes.

One example of a planting mechanism 10 is shown in FIG. 1. Such arrangements may be referred to using a variety of names such as a "gang", an "opener" or a "run". Modern planters may comprise numerous individual planting units, sometimes eighty or more, often arranged in a staggered array (as shown in FIG. 31) to allow closer spacing. Individual planting mechanisms commonly comprise a tool bar 15 to which the other members are attached. The tool bar 15 usually includes one or more attachment points 20 which allow the tool bar to be mounted to a planter unit, raised and lowered between a working position and a travel position, and removed for maintenance. One or more coulters 30, 35 open a furrow to the desired depth for the planting of seeds. In this particular example, disc-type coulters are shown in a dual coulter arrangement. Coulter 35 is shown in outline form so as not to obscure the area between the coulters. A seed tube 40 is mounted to the tool bar 15 and delivers seeds to the furrow opened between the coulters. Once the seeds have been deposited in the furrow, a closing wheel 25 covers the seeds and closes the furrow.

FIG. 2 is a top plan view of another planting mechanism 45. This particular example also shows a dual coulter 65, 66 arrangement with a seed tube 70 delivering seeds between the coulters 65, 66 into the opened furrow. In this example, tool bar 60 is shown in outline form so as not to obscure the area between the coulters. A closing wheel 50 is also attached to the tool bar 60. As seen from the top, the coulters 65, 66 are not parallel to one another but rather disposed at an angle relative to one another and to the tool bar. This outward or negative "toe" allows the coulters to cut and clear a furrow. In some examples, the coulters may also have a camber, that is, the coulter is not disposed perpendicular to the ground. Rather, the portion of the coulters which contact the ground and usually closer together than the portions which are distal from the ground (i.e., they have a positive camber angle). In existing planters, the toe and camber angles of coulters are fixed and can only be adjusted by replacing the coulters and/or the mounting members to which the coulters are attached. As seen in FIG. 3, individual planting mechanisms 45 may be arranged in a staggered fashion so as to allow for closer spacing on a planter.

SUMMARY

The present invention involves planting mechanism for use with seed drill planter. First, a tool bar is mountable to a seed drill planter, and two disc-type coulters are operationally mounted to the tool bar. The positioning of the disc-type coulters relative to the tool bar is adjustable, wherein the positioning of the disc-type coulters relative to the tool bar is lockable once the desired positioning is achieved.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
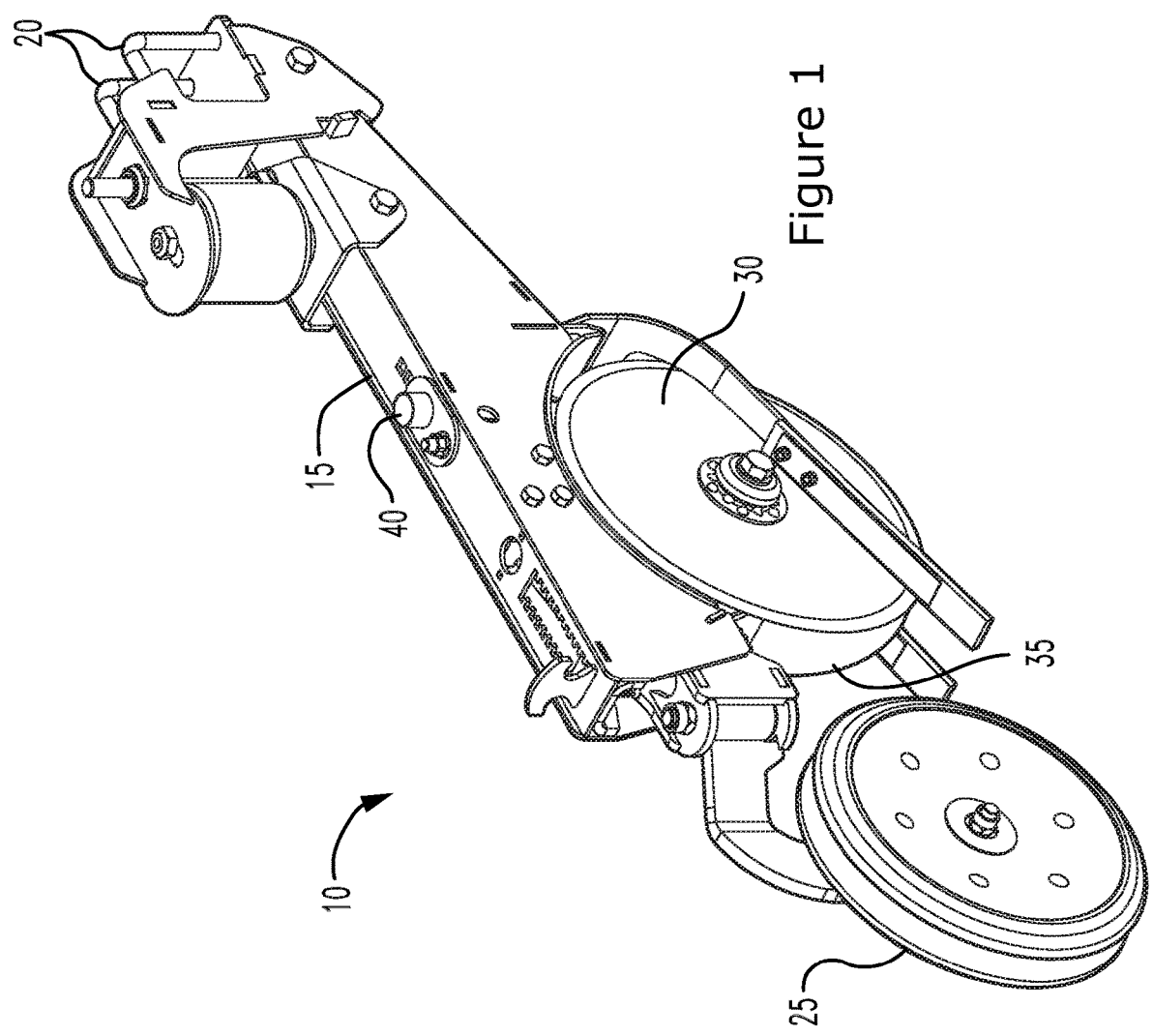
FIG. 1 is a side perspective view of a planting mechanism for a grain drill known in the art.
Figure 2:
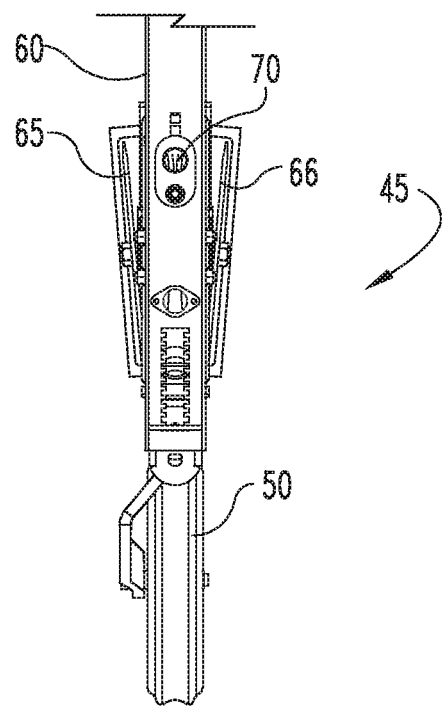
FIG. 2 is a top plan view of a planting mechanism for a grain drill known in the art.
Figure 3:
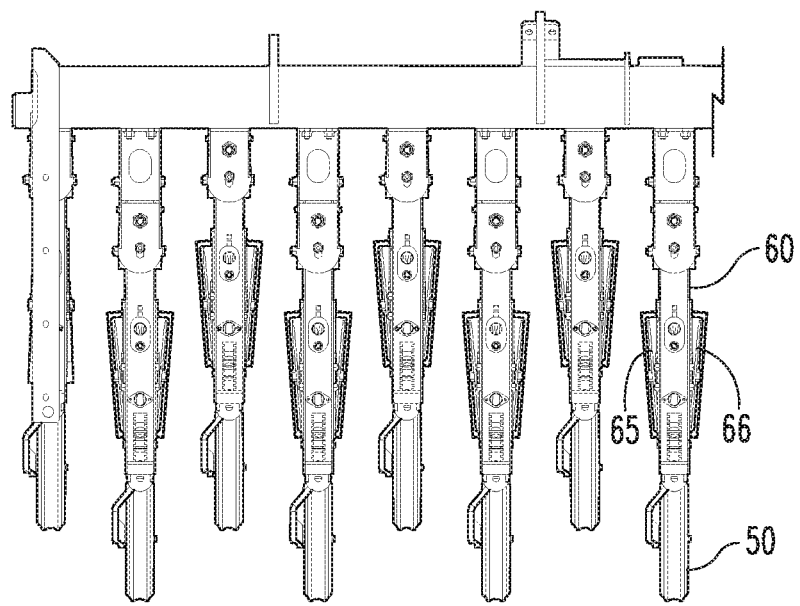
FIG. 3 is a top plan view of a plurality planting mechanisms from FIG. 1 for a grain drill known in the art.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION

The embodiments disclosed below are not intended to be exhaustive or limit the invention to the precise forms disclosed in the following detailed description. Rather, the embodiments are chosen and described so that others skilled in the art may utilize their teachings.

A variety of factors may determine the optimal positioning of coulters during planting so as to achieve the desired seed positioning. Soil type (sandy, loamy, clay, etc.), soil moisture content, field litter (such as plant material from previous crops), and ground speed may all affect the quality of the furrow being opened by the coulters. If the coulters are fixed in position relative to one another then the operator must adjust other variables (such as ground speed during planting) or perform additional work to improve conditions (such as additional passes with implements to break up field litter or hard soil). Allowing the position of the coulters relative to one another to be adjusted allows the operator to achieve better furrow production and seed placement under a wider variety of field conditions.

Figure 4:
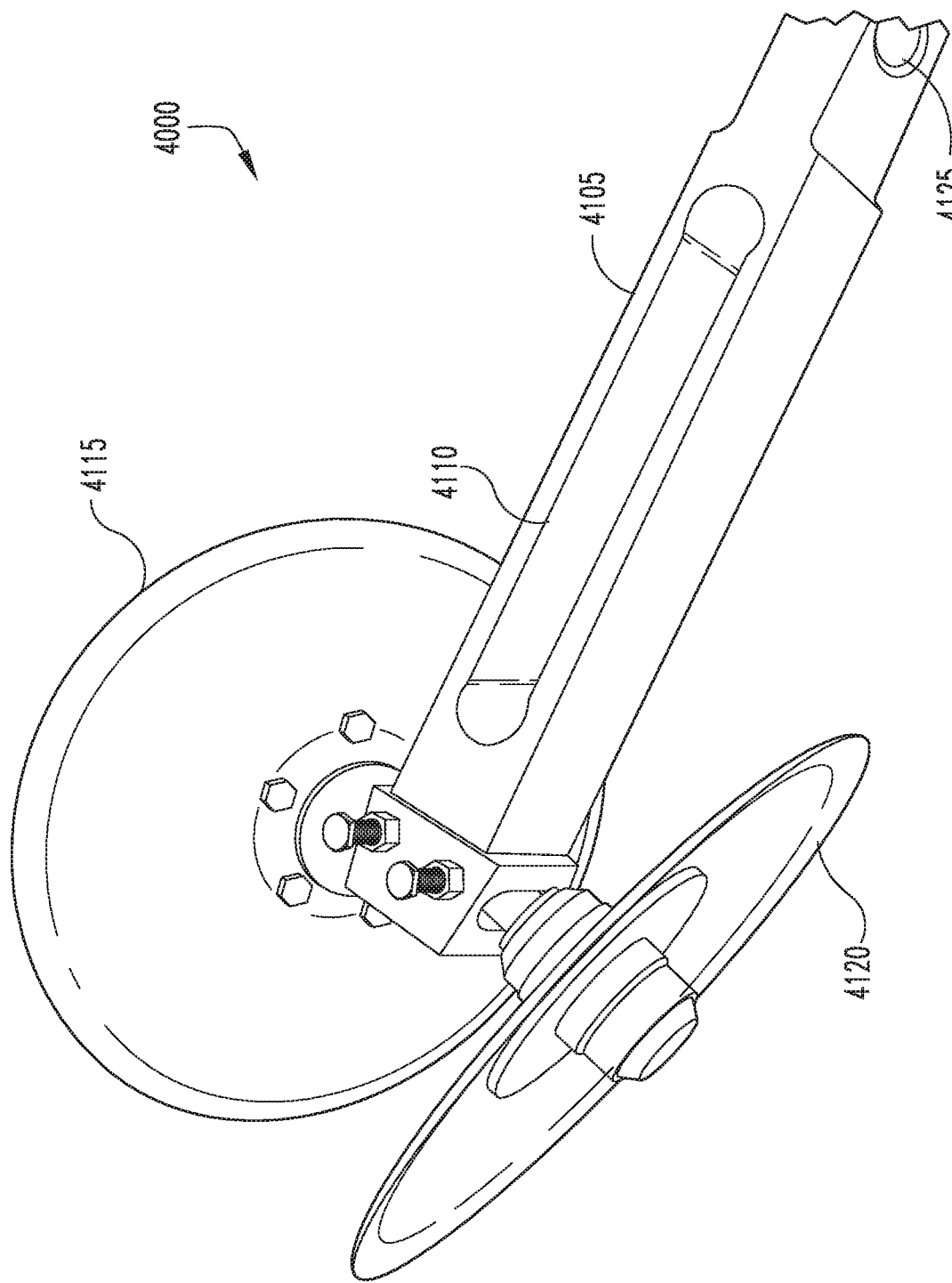
FIG. 4 is side perspective view of one embodiment of the disclosed invention.
Figure 5:
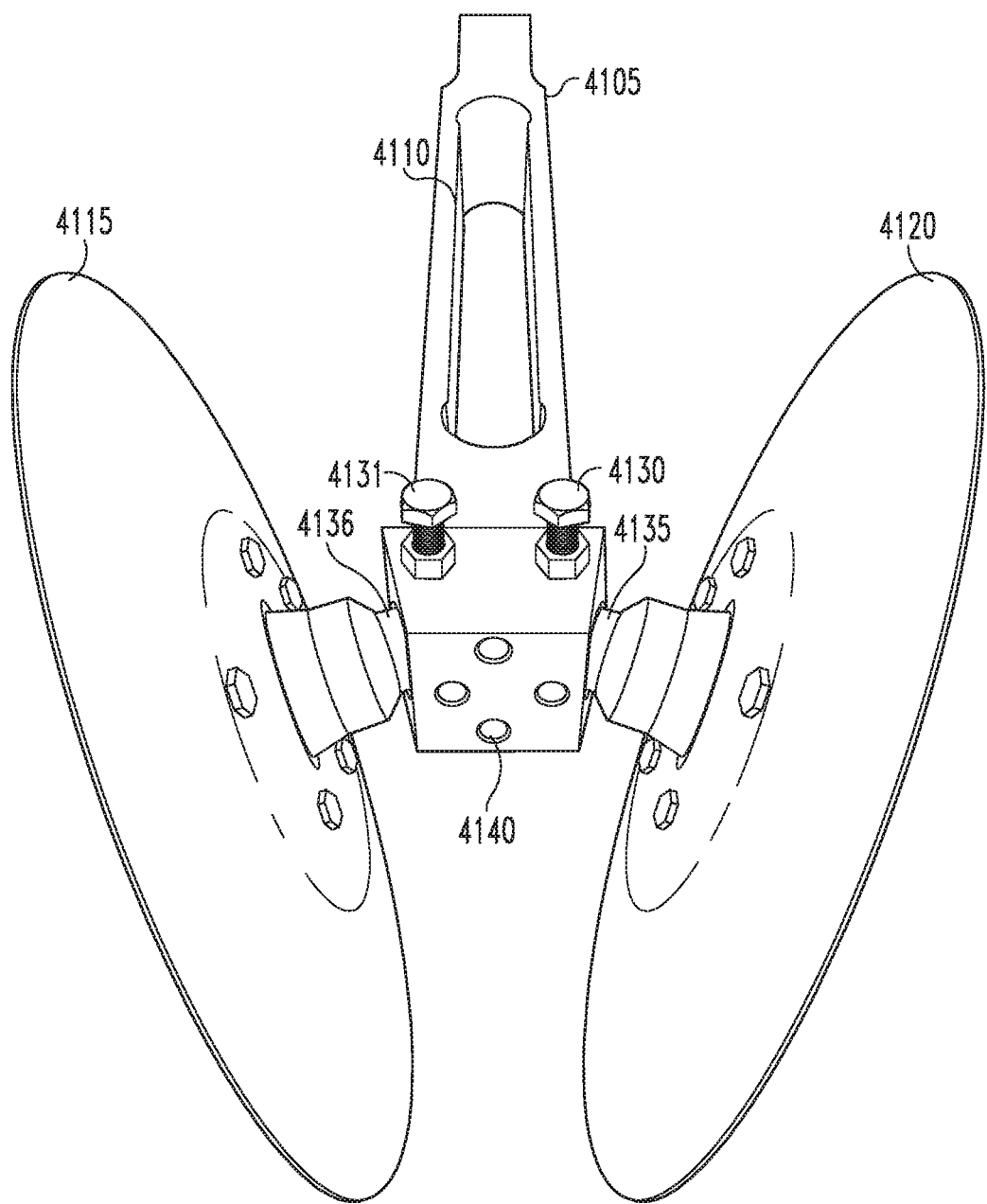
FIG. 5 is a rear view of the embodiment shown in FIG. 4.
Figure 6:
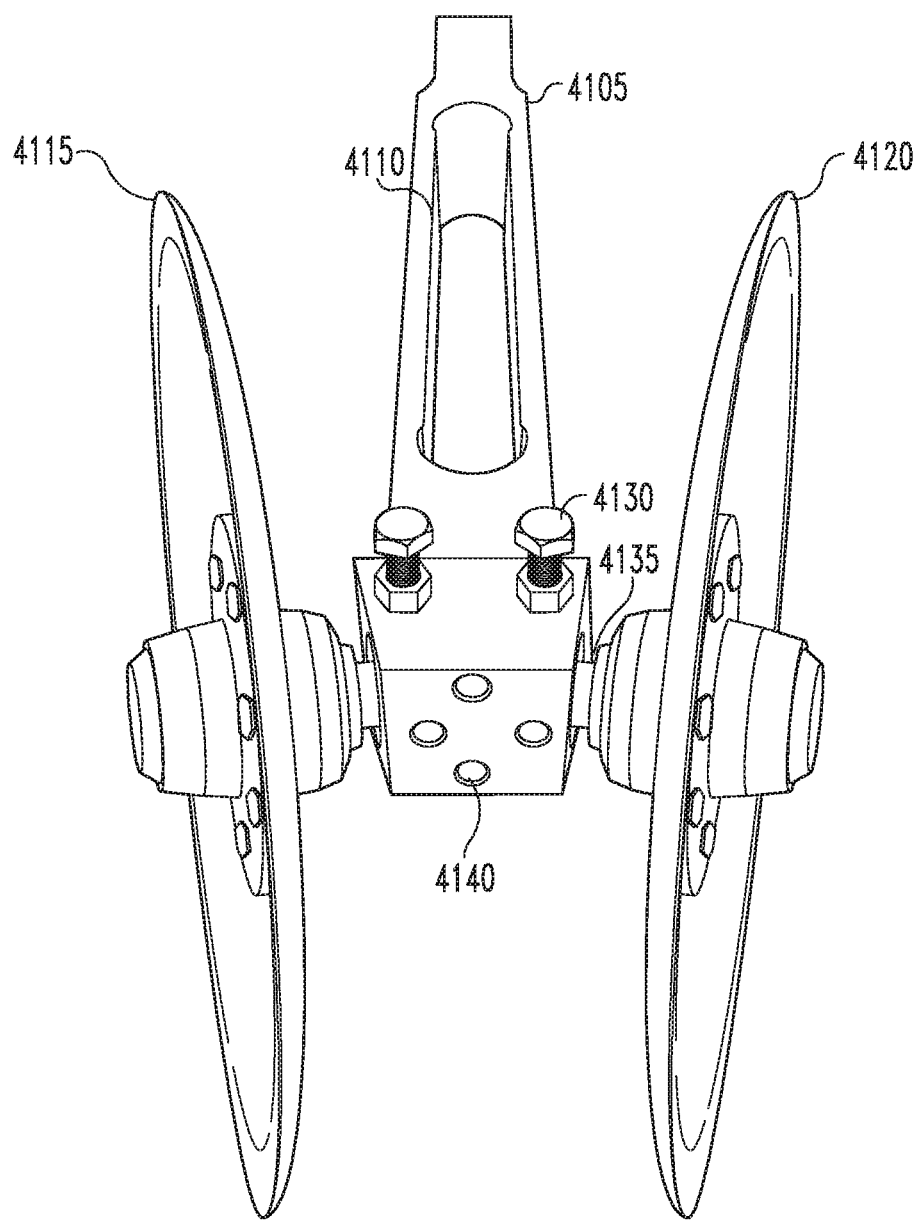
FIG. 6 is another rear view of the embodiment shown in FIG. 4.

One illustrative example of the disclosed invention is shown in FIGS. 4-6. In this particular embodiment, planting mechanism 4100 comprises tool bar 4105 operationally attached to two disc-type coulters 4115, 4120. Tool bar 4105 includes attachment point 4125 configured and arranged so that the planting mechanism may be mounted to a planter. In this particular example, attachment point 4125 is configured to allow attachment of the planting mechanism to a seed drill planter. In other examples, the attachment point may be configured to allow attachment of the planting mechanism to a row crop planter. In still other examples, the attachment point may be a mounting plate, hinge, or other suitable attachment means. In still other examples, more than one attachment point may be used. Tool bar 4105 further includes slot or channel 4110 allowing items such as a seed tube or delivery devices for delivering fertilizer to pass therethrough. In other examples, mounting or securing brackets for attachment of such items may also be included.

Disc coulters 4115, 4120 are each operationally connected to tool bar 4105 by spindle or axle 4135 and 4136, respectively. Spindles 4135, 4136 are capable of pivoting relative to tool bar 105 such that the position of coulters 4115, 4120 relative to tool bar 4105 and the ground is adjustable. For example, coulters as shown in FIG. 6 are positioned such that the edges of the discs contacting the soil are closer together than the edges of the discs distal from the ground. That is, the discs have a positive camber angle. The coulters are also positioned such that the edges of the discs closest to attachment point 4125 of tool bar 4105 are farther apart than the edges of the discs distal from the attachment point. That is, the discs have a negative toe or a toe out. When the discs have been adjusted to the desired position relative to the tool bar, the position of spindles 4135, 4136 may be locked in place by tightening locking pin 4130, 4131. In this particular example, locking pins 4130 and 4131 are shown as bolts which contact spindles 4135, 4136 when tightened thereby securing the spindles in place relative to the tool bar. In other examples, the locking pins may be set screws, pins, plates, or the like. In still other examples, the spindles may include notches, grooves, or other indents sized and configured to receive the locking pins. These indents may be positioned so as to create one or more "preset" orientations for the coulters.

As seen in FIG. 6, the positioning of coulters 4115, 4120 have been adjusted from that shown in FIG. 5. In this illustration, the coulters are position such that the edges in contact with the ground are relatively the same distance apart from one another as the edges distal from the ground are apart from each other. That is, the coulters have a near zero or neutral camber. The edges of the coulters which are nearest the attachment point for the tool bar are farther apart from one another than the edges which are distal from the attachment point, but the difference is not as great as shown in FIG. 5. That is, the coulters have a positive toe in FIG. 6, but a smaller toe than the discs shown in FIG. 5.

In this particular example, tool bar 4105 further includes attachment point 4140 to which other devices may be attached. For example, a firmer tool, a closing wheel, or both, may be attached to attachment point 4140. Attachment point 4140 is shown as a series of bolt holes in this example, but in other examples it may be mounting pins, bolts, eye bolt, hook, or other suitable mounting devices. In still other examples, the attachment point allows for pivotable or adjustable mounting of a device such that the position of the mounted device may be adjusted relative to the tool bar in a fashion similar to how the coulters are adjustable.

Figure 7:
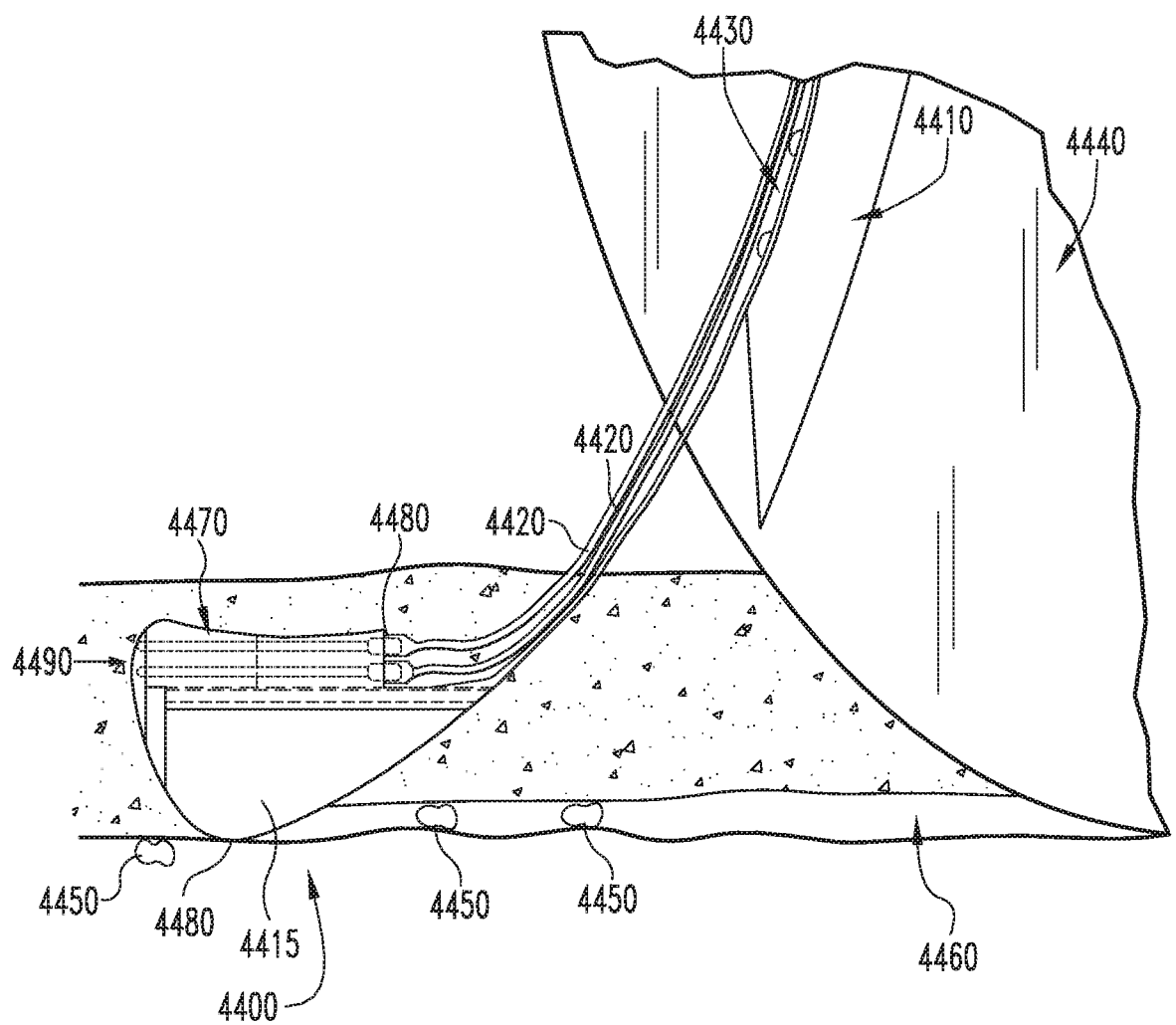
FIG. 7 is a side view of another embodiment of the disclosed invention with a seed firmer.

FIG. 7 shows another embodiment of the disclosed invention which further comprises seed firmer 4400 disposed in operation, having embedding pusher portion, or extender, 4415 positioned relative to seed chute 4410 in a conventional manner Seed chute 4410 is positioned relative to disc coulter 4440 by mount 4430 so that chute 4410 delivers seeds 4450 to trough 4460, with extender portion 4415 being so positioned to embed seeds 4450 into the soil of trough 4460. Firmer 4400 includes interior channel 4470 which extends from nipples 4480 to end point 4490, and is sized to receive tube 4420, which in this exemplary embodiment involves conventional liquid tubes that deliver herbicides, fertilizers, pesticides, and/or mixtures of those chemicals to deposit on or near seed 4450 once embedded.

Figure 8:
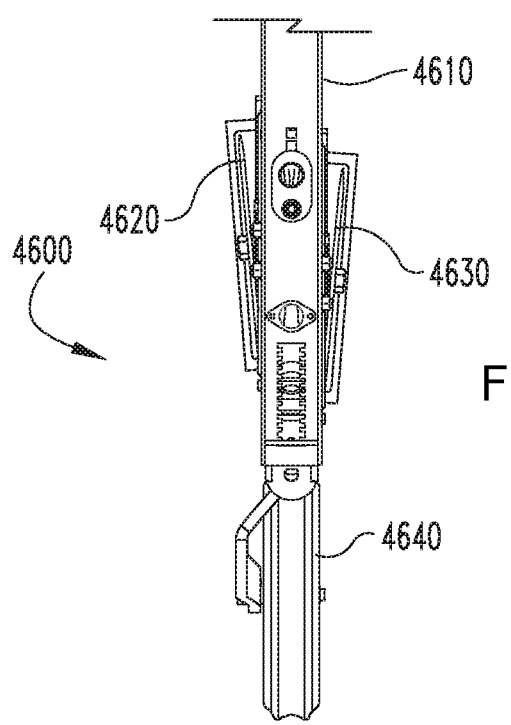
FIG. 8 is a top plan view of an alternate embodiment of the disclosed invention.

FIG. 8 shows an alternate embodiment of the disclosed invention. In this particular embodiment, dual coulters 4620, 4630 are attached at different distances along the length of tool bar 4610. This particular example results in planting mechanism 4600 where one coulter 4620 is closer to the point where tool bar 4610 is attached to the planter (not shown) and other coulter 4630 is closer to closing wheel 4640. Both coulters 4620, 4630 are fully adjustable as previously discussed above with respect to the embodiment shown in FIGS. 4-6.

Figure 9:
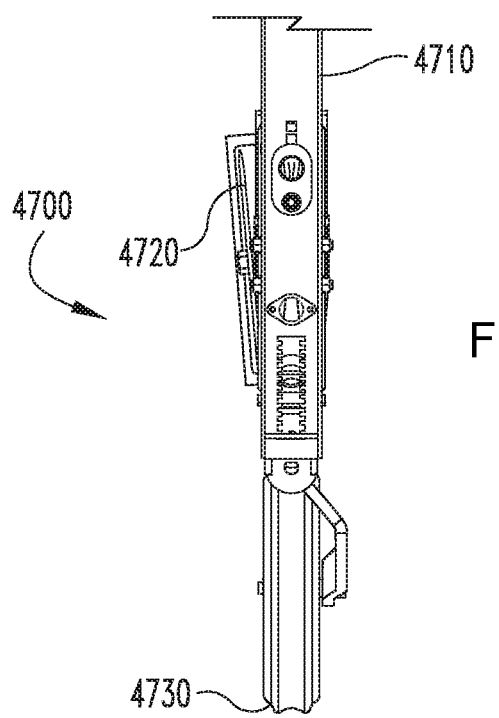
FIG. 9 is a top plan view of still another embodiment of the disclosed invention.

FIG. 9 shows yet another embodiment of the disclosed invention. In this particular embodiment, planting mechanism 4700 comprises single coulter 720 and closing wheel 4730 attached to tool bar 4710. Coulter 4720 is fully adjustable as previously discussed about with respect to the embodiment shown in FIGS. 4-6.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A planting mechanism for use with seed drill planter, comprising:
   a tool bar, mountable to a seed drill planter;
   two disc coulters operationally mounted to the tool bar by two corresponding spindles capable of pivoting relative to the tool bar, each of the spindles having a locking mechanism that is capable of locking, at any point of the rang of pivoting, the relative position of the disc coulter and the tool bar at any of the pivoting positions;
   wherein positioning of the disc coulters relative to the tool bar is adjustable; wherein the positioning of the disc coulters relative to the tool bar is lockable at any of the angles of the disc coulters relative to the tool bar.

2. The planting mechanism of claim 1, wherein the tool bar further includes a mounting point for attaching additional implements to the tool bar including at least one of a closer wheel and a firmer bar.

3. A planting mechanism for use with seed drill planter, comprising:
   a tool bar, mountable to a seed drill planter;
   at least one disc coulter operationally mounted to the tool bar by at least one corresponding spindle capable of pivoting relative to the tool bar, each spindle having a locking mechanism that is capable of locking, at any point of the range of pivoting, the relative position of the disc coulter and the tool bar at any of the pivoting positions;
   wherein positioning of the at least one disc coulter relative to the tool bar is adjustable;
   wherein the positioning of the at least one disc coulter relative to the tool bar is lockable at any of the angles of the disc coulters relative to the tool bar.

4. The planting mechanism of claim 3, further comprising:
   a spindle operationally connecting the at least one disc coulter to the tool bar;
   wherein the spindle is pivotable.

5. The planting mechanism of claim 4, further comprising:
   a locking pin;
   wherein the locking pin is movable between a locked and an unlocked position;
   wherein the spindle is capable of pivoting when the locking pin is in the unlocked position; and
   wherein the spindle is not capable of pivoting when the locking pin is in the locked position.

6. The planting mechanism of claim 5, wherein the spindle further includes at least one indent sized and configured to receive the locking pin in the locked position.

* * * * *